United States Patent [19]
Holmes

[11] Patent Number: 5,816,574
[45] Date of Patent: Oct. 6, 1998

[54] GAME FOR LEARNING FOREIGN LANGUAGES

[76] Inventor: Dorothy R. Holmes, 29 Rossmoyne Drive Rossmoyne, Perth, Australia, 6148

[21] Appl. No.: 817,102
[22] PCT Filed: Aug. 30, 1995
[86] PCT No.: PCT/AU95/00559
  § 371 Date: Feb. 13, 1997
  § 102(e) Date: Feb. 13, 1997
[87] PCT Pub. No.: WO96/07169
  PCT Pub. Date: Mar. 7, 1996

[30] Foreign Application Priority Data

Aug. 30, 1994 [AU] Australia ................................ PM7776

[51] Int. Cl.⁶ .................................................. A63F 3/00
[52] U.S. Cl. ........................... 273/272; 454/157; 454/129
[58] Field of Search ........................... 273/272; 434/156, 434/157, 128, 129

[56] References Cited

U.S. PATENT DOCUMENTS

| | | | |
|---|---|---|---|
| 3,724,102 | 4/1973 | Van Patten | 434/157 |
| 5,178,542 | 1/1993 | Chigrinsky et al. | 434/157 |
| 5,275,569 | 1/1994 | Watkins | 434/157 |
| 5,275,818 | 1/1994 | Kind | 434/157 |
| 5,316,482 | 5/1994 | Bryson | 434/129 |
| 5,486,111 | 1/1996 | Watkins | 424/157 |
| 5,525,060 | 6/1996 | Loebner | 434/157 X |
| 5,645,280 | 7/1997 | Zelmer | 273/272 X |

*Primary Examiner*—William E. Stoll

[57] ABSTRACT

This invention relates to a game and particularly, though not exclusively to a board game using a foreign language such as bahasa Indonesia, and a national language such as English. In one embodiment of the invention there is a board game comprising a game box (12) and a playing board (13, FIG. 2). The game box includes decks of key words/phrase cards (26), instruction/conversation starter cards (28), and conversation starter cards (24). Included is a set of playing markers used to move around the playing board. An advance wheel (32) is provided as a random number generating device for determining the number of spaces a player is to move around the board. The playing board has drawings/photographs together with instructions in the foreign language located in one or more spaces defining a first or second track (42), (44) respectively, positioned around the playing board. Each playing card has a word, phrase, or instruction located on one surface in a foreign language, and on an opposite surface a translation in a national language. The game is played by one or more players conversing in the foreign language using instructions, key words/phrases and/or conversation starters provided on the playing board or on one or more cards. Reference can be made to the translation on the reverse side of each card to assist the player in conversing in the foreign language. A foreign language can thus be learnt and developed in a fun and entertaining way.

20 Claims, 11 Drawing Sheets

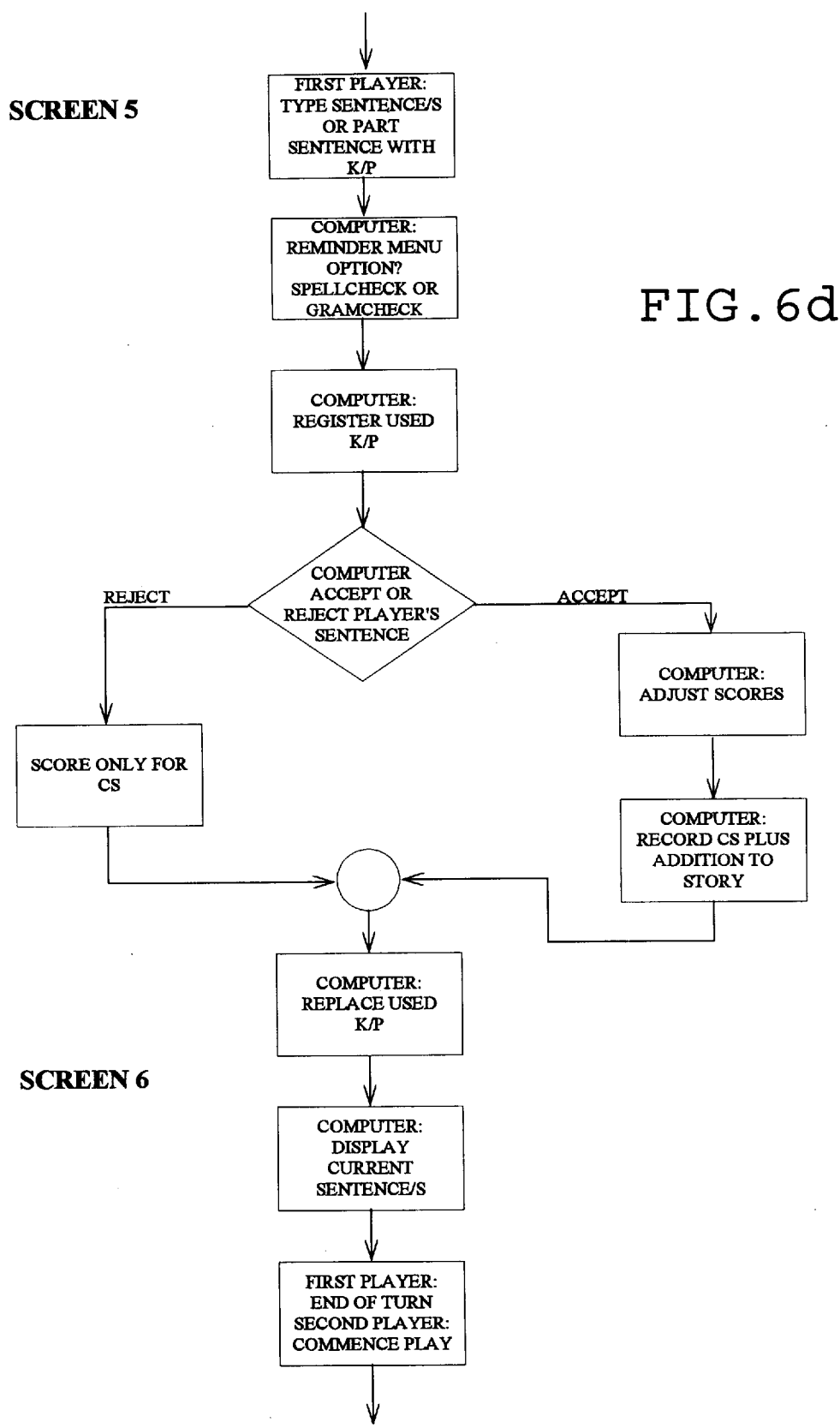

GAME FOR LEARNING FOREIGN LANGUAGES

FIELD OF THE INVENTION

The present invention relates generally to a game and relates particularly, though not exclusively, to a board game using a foreign language, such as bahasa Indonesian, and a national language, such as the English language.

BACKGROUND TO THE INVENTION

There are a myriad of games presently available which are designed to develop and improve our vocabulary and language skills. These known games are played in a single language which is generally the national language or the language most commonly spoken in a country. Board games such as SCRABBLE test players' vocabulary by building and developing words from letter pieces which are placed on a board subdivided into squares.

As overseas travel and communication increases together with globalisation so does our need to be conversant in more than one language. For example, Australia's move into the Asian region with a trend toward free trade zones, embodied in international trade agreements, is increasingly important to our economy. The ability of Australians to converse in a variety of foreign languages may substantially assist and improve our trade relations with foreign countries. The success of a country's economy may, therefore, to some extent depend largely on the ability to communicate with people in foreign markets in their own language.

In Australia legislation has now been ratified whereby schools must include the learning of a second language as a compulsory part of the student syllabus. This proposal has largely eventuated as a result of the increased activity with our trading neighbours in, for example, South East Asia. Federal and State Governments view an ability to be conversant in one or more foreign languages as an important element in our future foreign trade success.

SUMMARY OF THE INVENTION

An intention of the present invention is to provide a game that can be played to learn and develop an understanding in a foreign language, the game being both educational and fun to play.

According to a first aspect of the present invention there is provided an apparatus for playing a game comprising:

a playing surface subdivided into a plurality of first adjacent spaces defining a first track each of said first spaces containing at least an instruction in a foreign language;

a set of playing markers each playing marker to be used by a player for moving about the first track; and means for carrying information for displaying one or more keywords/phrases which can be selected from a plurality of keywords/phrases and displayed in both a national language and a substantial translation thereof in the foreign language whereby, in use, a player begins or continues a conversation in the foreign language and the player or another player having moved one of said playing markers about the first track continues the conversation or begins a new conversation, in accordance with the instruction contained in the space on which said player's playing marker resides, in the foreign language using their own foreign language vocabulary in conjunction with said one or more keywords/phrases selected from said plurality of keywords/phrases.

Preferably, the means for carrying information can also display one or more conversation starters randomly selected from a plurality of predetermined conversation starters each having at least part of a sentence which can be displayed in both the national language and a substantial translation thereof in the foreign language whereby, in use, a player can begin a conversation in the foreign language using said at least part sentence from said one or more randomly selected conversation starters.

Typically, said means for carrying information can also display one or more instructions/conversation starters randomly selected from a plurality of predetermined instructions/conversation starters at least some having at least part of a sentence and/or an instruction in the national language, and a substantial translation thereof in the foreign language whereby, in use, said one or more randomly selected instructions/conversation starters can be used, when directed from the playing surface, to begin or continue a conversation in the foreign language using a part sentence contained therein and/or to score the player according to an instruction contained thereon.

In one example the playing surface further comprises a plurality of second adjacent spaces defining a second track each space containing an instruction of a different vocabulary level compared to the instructions contained in the plurality of first adjacent spaces whereby, in use, a player can move from the spaces of the first track to the second track.

Advantageously the playing surface has instructions in either the foreign language or the national language depending on a player's choice whereby, in use, the game can be played in either the foreign or the national language.

Preferably, the apparatus further comprises a random number generating means used for randomly selecting the number of spaces a playing marker is to be moved whereby, in use, a playing marker is moved between the first spaces, according to a number randomly selected using the random number generating means, whereupon a player thereof can follow an instruction contained in a space on which the playing marker lands and the player is scored and/or begins or continues a conversation in the foreign language.

Typically, the random number generating means comprises:

a first ball race graduated from one to twelve adapted to movably receive a first ball whereby, in use, the number corresponding to the graduation on the first race adjacent the first ball is equal to the number of spaces a playing piece can be moved on the playing surface.

Advantageously the number corresponding to the graduation on the first race designates a calendar month which can then be used by a player in beginning or continuing a conversation in the foreign language.

In another example the random number generating means further comprises:

a second ball race graduated from one to sixty adapted to movably receive a second ball whereby, in use, the position of the first and second balls in the first and second ball races, respectively, designates a time which can be read and answered or used by a player in beginning or continuing a conversation in the foreign language.

Advantageously said plurality of predetermined conversation starters are grouped according to their relative vocabulary level in the foreign language, wherein said one or more conversation starters can be selected according to the relative ability of the player in the foreign language.

Advantageously said plurality of keywords/phrases are grouped according to their relative vocabulary level in the foreign language, wherein said one or more keywords/ phrases can be selected according to the relative ability of the player in the foreign language.

In one embodiment the means for carrying information comprises one or more decks of playing cards.

In an alternative embodiment the means for carrying information comprises a visual display unit and a computer processor operatively coupled together.

According to a second aspect of the present invention there is provided a method for playing a game comprising the steps of:

providing a playing surface having a plurality of first adjacent spaces, a set of playing markers, and means for carrying information for displaying one or more keywords/phrases which can be selected from a plurality of keywords/phrases, said one or more keywords/ phrases being displayable in both a national language and a substantial translation thereof in a foreign language;

one or more players each selecting one or more keywords/ phrases from the plurality of keywords/phrases, each of said players in turn, having moved one of the set of playing markers about the playing surface, said surface, following an instruction contained in one of the first spaces on which said player's playing marker reside, said player in following the instruction beginning or continuing a conversation in the foreign language using their own foreign vocabulary in conjunction with said one or more selected keywords/phrases; and scoring said player according to said player's ability and/or usage of said one or more keywords/phrases in conversing in the foreign language.

Typically, the means for carrying information can also display one or more conversation starters randomly selected from a plurality of conversation starters each having at least one sentence which can be displayed in both the national language and a substantial translation thereof in the foreign language said method further comprising the step of said player or said another player beginning a conversation in the foreign language using said at least one sentence from said one or more randomly selected conversation starters.

Preferably, said plurality of conversation starters and keywords/phrases are grouped according to their relative vocabulary level in the foreign language, wherein the method for playing the game further comprises the step of selecting said one or more conversation starters and/or keywords/phrases according to the relative ability of the player in the foreign language.

Typically, the means for carrying information can also display one or more instructions/conversation starters randomly selected from a plurality of predetermined instructions/conversation starters each having separately displayable at least part of a sentence and/or an instruction in the national language, and a substantial translation thereof in the foreign language, said method further comprising the step of a player, as directed from the playing surface, randomly selecting said one or more instructions/ conversation starters and beginning or continuing a conversation in the foreign language using a part sentence contained therein and/or scoring the player in accordance with an instruction contained thereon.

In another example the method for playing the game further comprises the step of moving the playing marker to a second space on the playing surface, containing an instruction of a different vocabulary level compared to the instructions contained in the first spaces, whereupon a player can follow the instruction and a conversation is begun or continued.

Typically, a player can refer to a sentence or keyword/ phrase being a substantial translation in the national language of a conversation starter or keyword/phrase, respectively, so as to assist them in beginning or continuing a conversation in the foreign language.

Preferably, a player is scored according to the number of keywords/phrases they have used in beginning or continuing a conversation.

BRIEF DESCRIPTION OF DRAWINGS

In order to achieve a better understanding of the nature of the present invention preferred embodiments of the game will now be described, by way of example only, with reference to the following drawings in which:

FIG. 6a to 6h is a flow diagram of a preferred method for playing the game, from which an appropriate computer program can be developed.

DETAILED DESCRIPTION OF PREFERRED EMBODIMENTS

Figure 1:
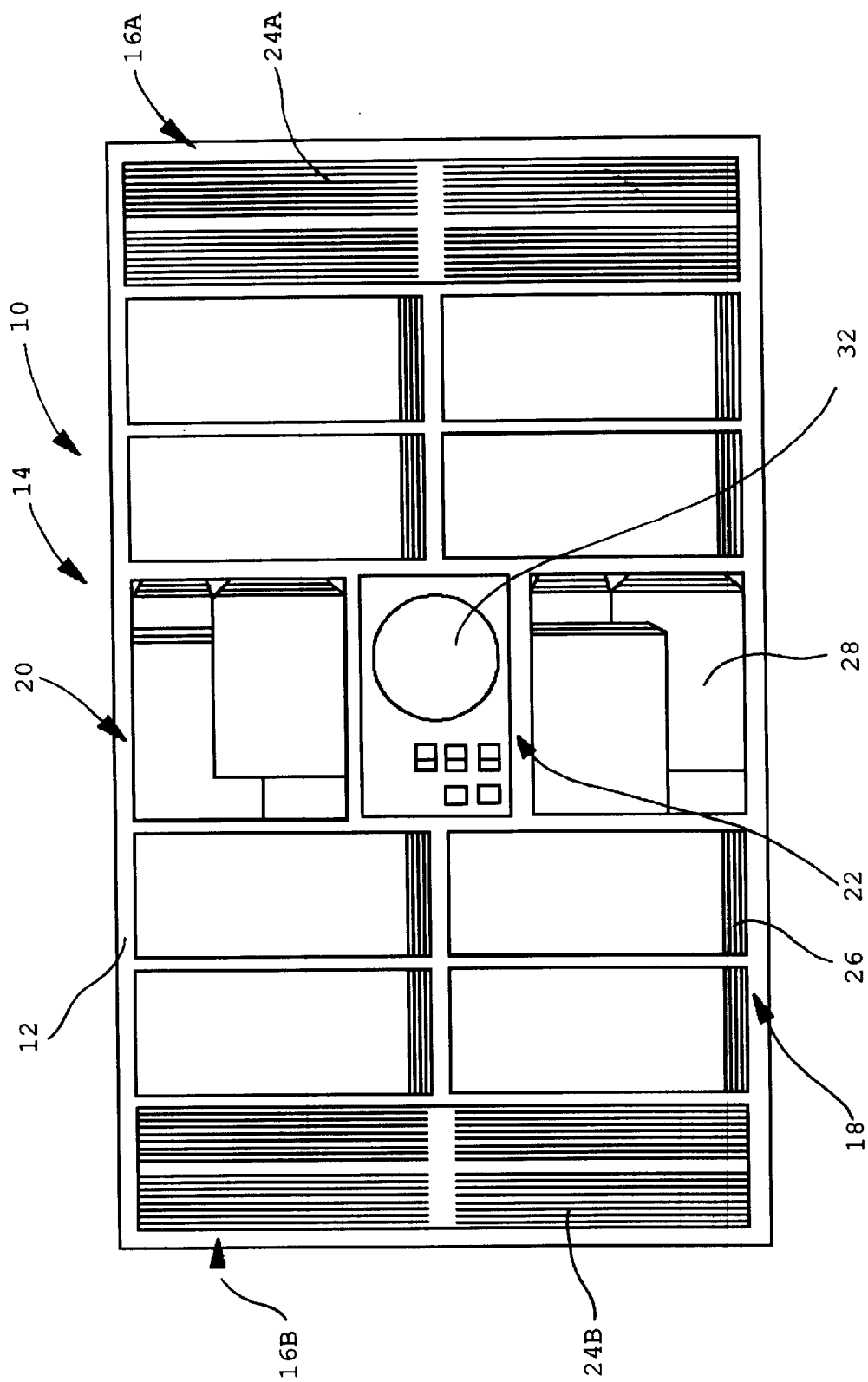
FIG. 1 is a schematic of a preferred embodiment of a game box showing the layout of various components thereof.
Figure 2:
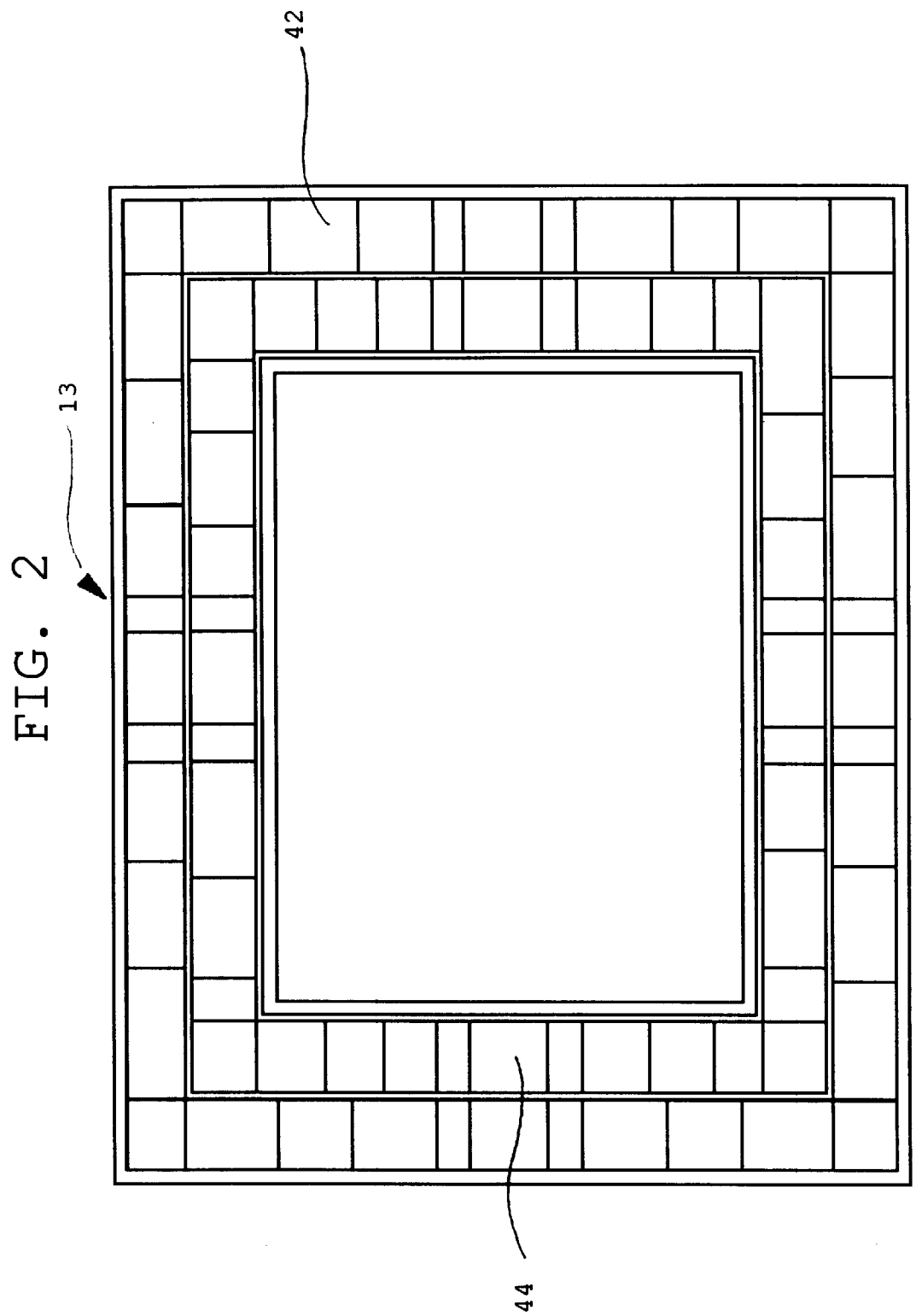
FIG. 2 is a schematic of one surface of a preferred embodiment of a playing surface shown for ease of understanding without pictures and/or instructions.

As shown in FIGS. 1 and 2 a game, in this example a board game 10, comprises a game box 12 and a playing board 13.

The game box 12 houses a number of component boxes 14, each box designed to hold various components of the board game 10.

The game box 12 includes a pair of conversation starter boxes 16A, 16B, eight (8) keyword/phrase boxes 18, two (2) instructions/conversation starter boxes 20, and a playing parts box 22. Each of the conversation starter boxes 16A, 16B contain four (4) decks of conversation starter cards 24A, 24B each of a different vocabulary level. Likewise, each of the keyword/phrase 18 and instructions/conversation starter boxes 20 contain a deck of keyword/phrase cards 26 and instruction/conversation starter cards 28, respectively, of different vocabulary levels. Thus, in this example, the deck of keyword/phrase cards 26, conversation starter cards 24, and instructions/conversations starter cards 28 are provided as means for carrying information.

Figure 3:
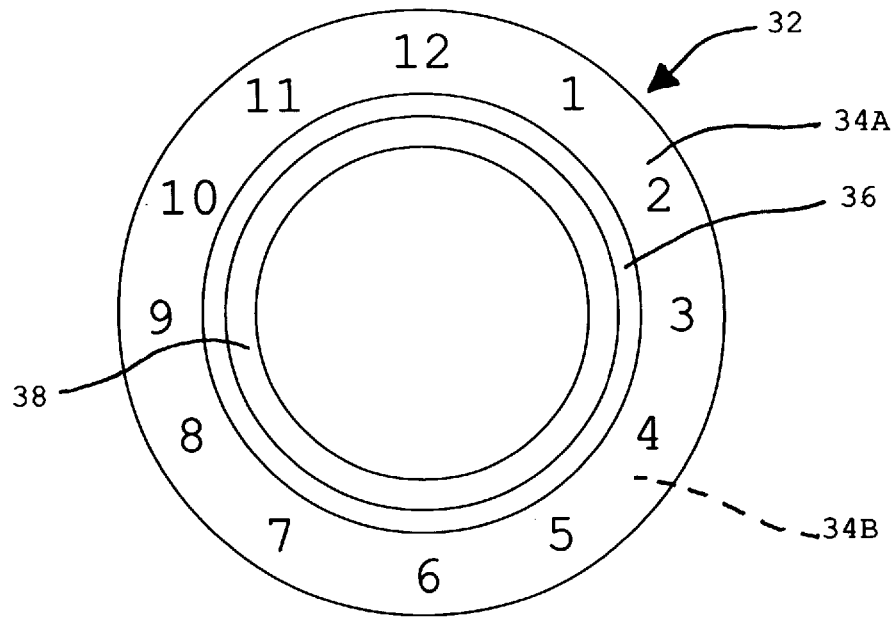
FIG. 3 is a schematic of a preferred embodiment of a random number generating means.

The playing parts box 22 contains a set of playing markers in this example fourteen (14) taws (five (5) of the taws are depicted in FIG. 2) each representing the seven (7) ancient and modern wonders of the world. The taws may be in the shape of a book with a colour on one side and an ancient or modern wonder on an opposite side. Alternatively, the taws may be cylindrical in shape and each player's name can be removably attached to or written on the cylindrical taw. The parts box 22 also contains a random number generating means, in this example an advance wheel 32, as shown in FIG. 3.

Figure 4:
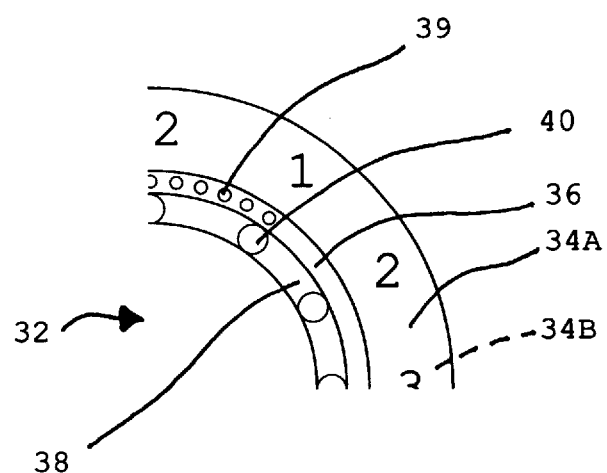
FIG. 4 is an exploded portion of the random number generating means shown in FIG. 3.
Figure 5:
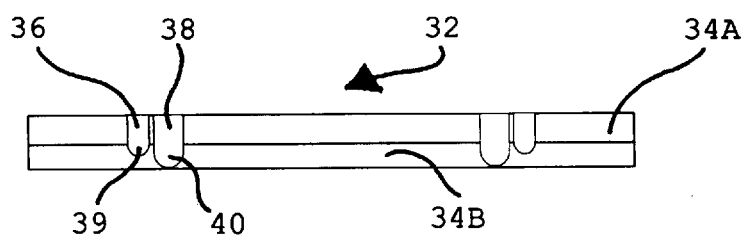
FIG. 5 is a cross-sectional view of the random number generating means shown in FIG. 3.
Figure 6A:
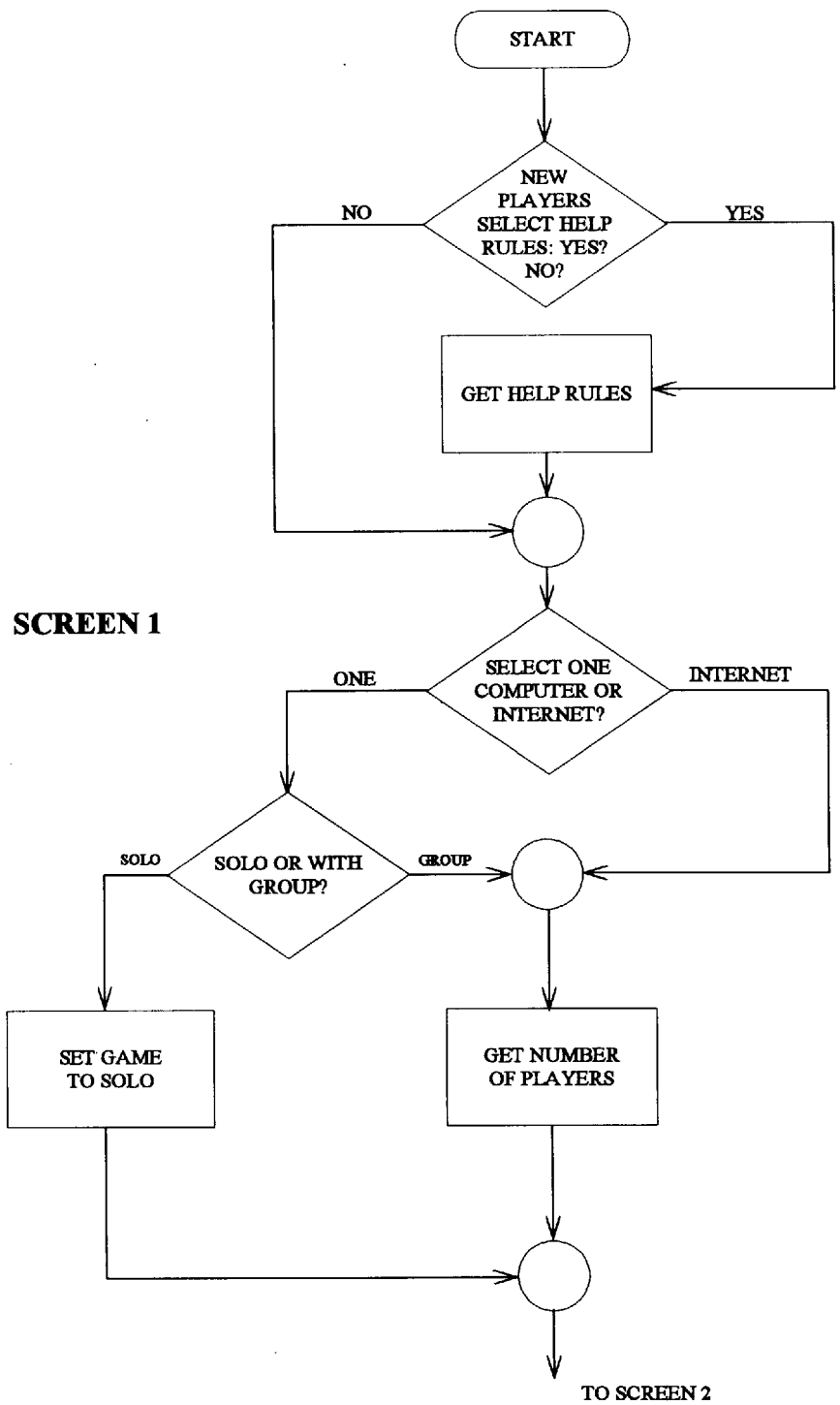
Figure 6B:
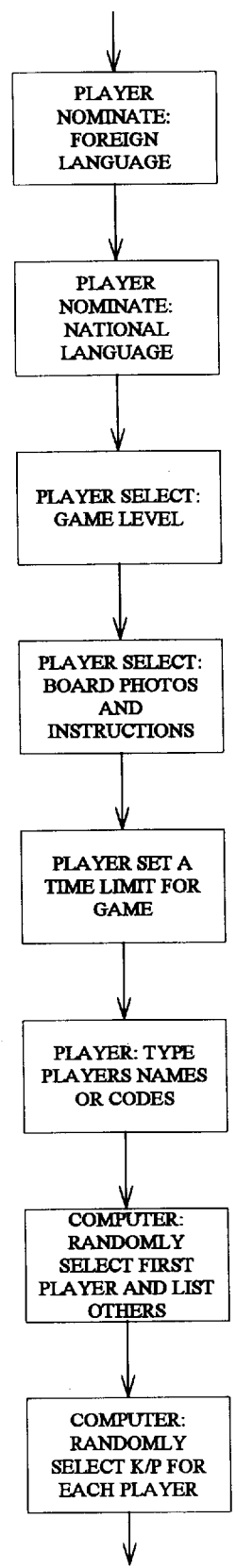
Figure 6C:
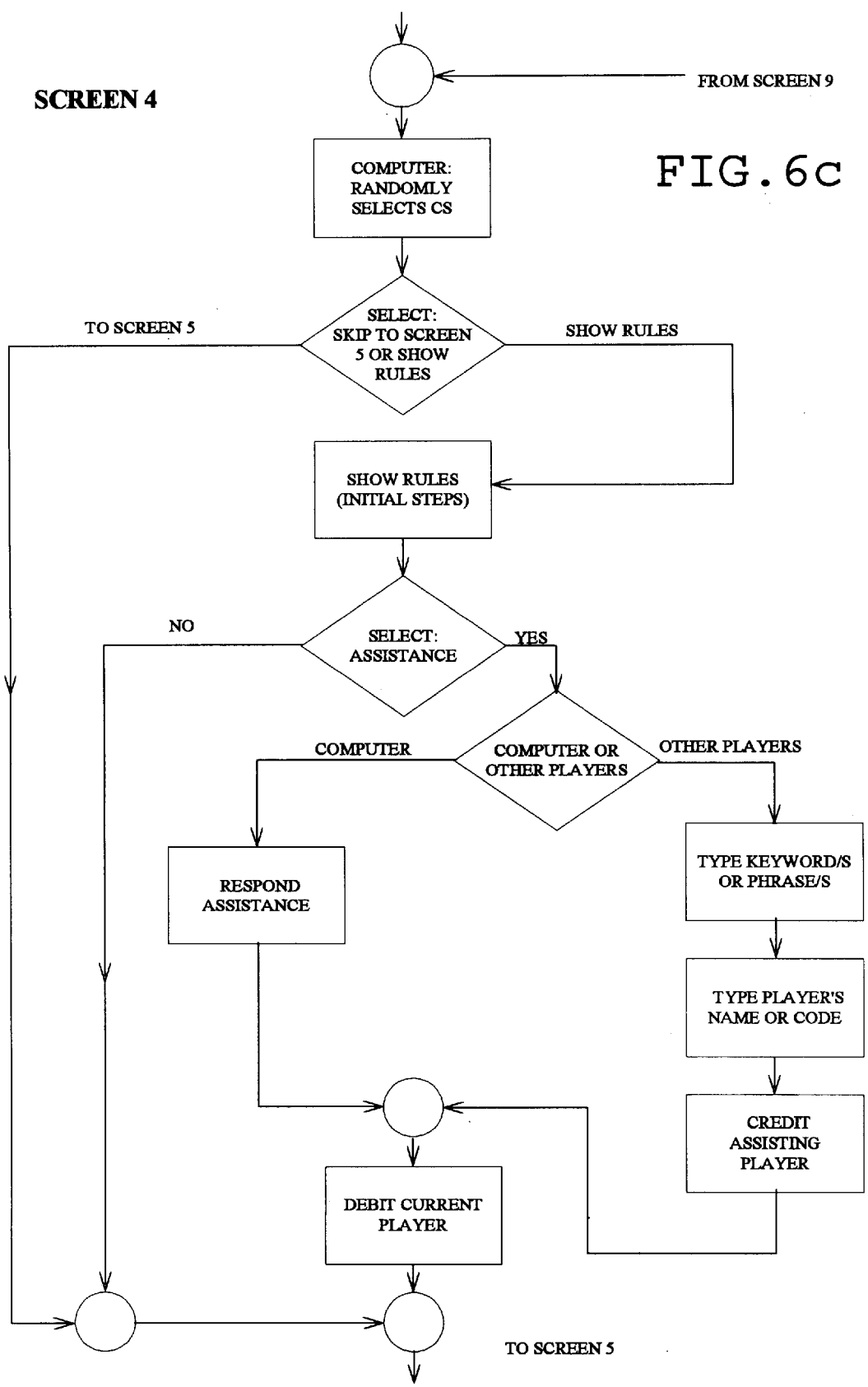
Figure 6E:
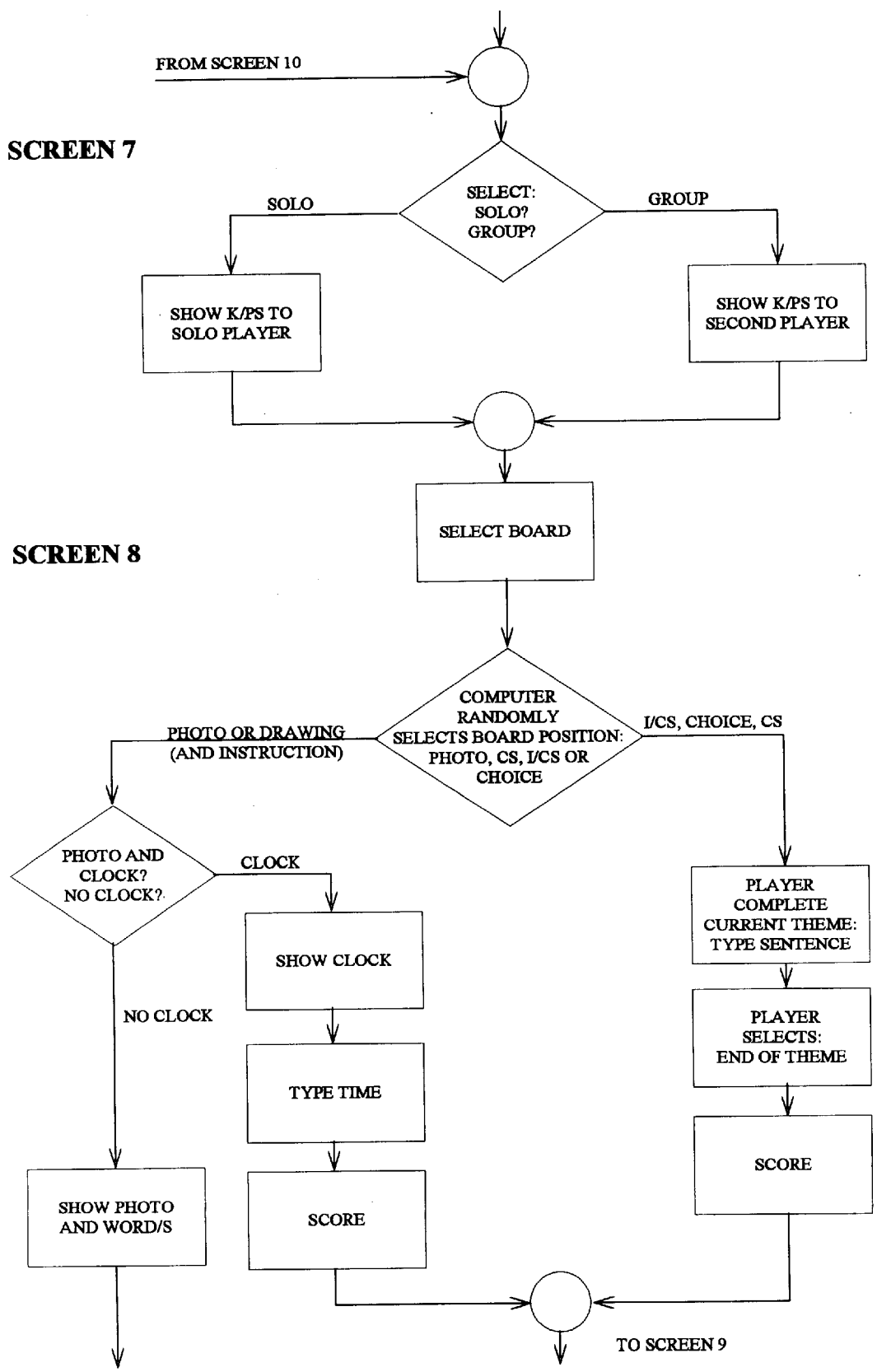
Figure 6F:
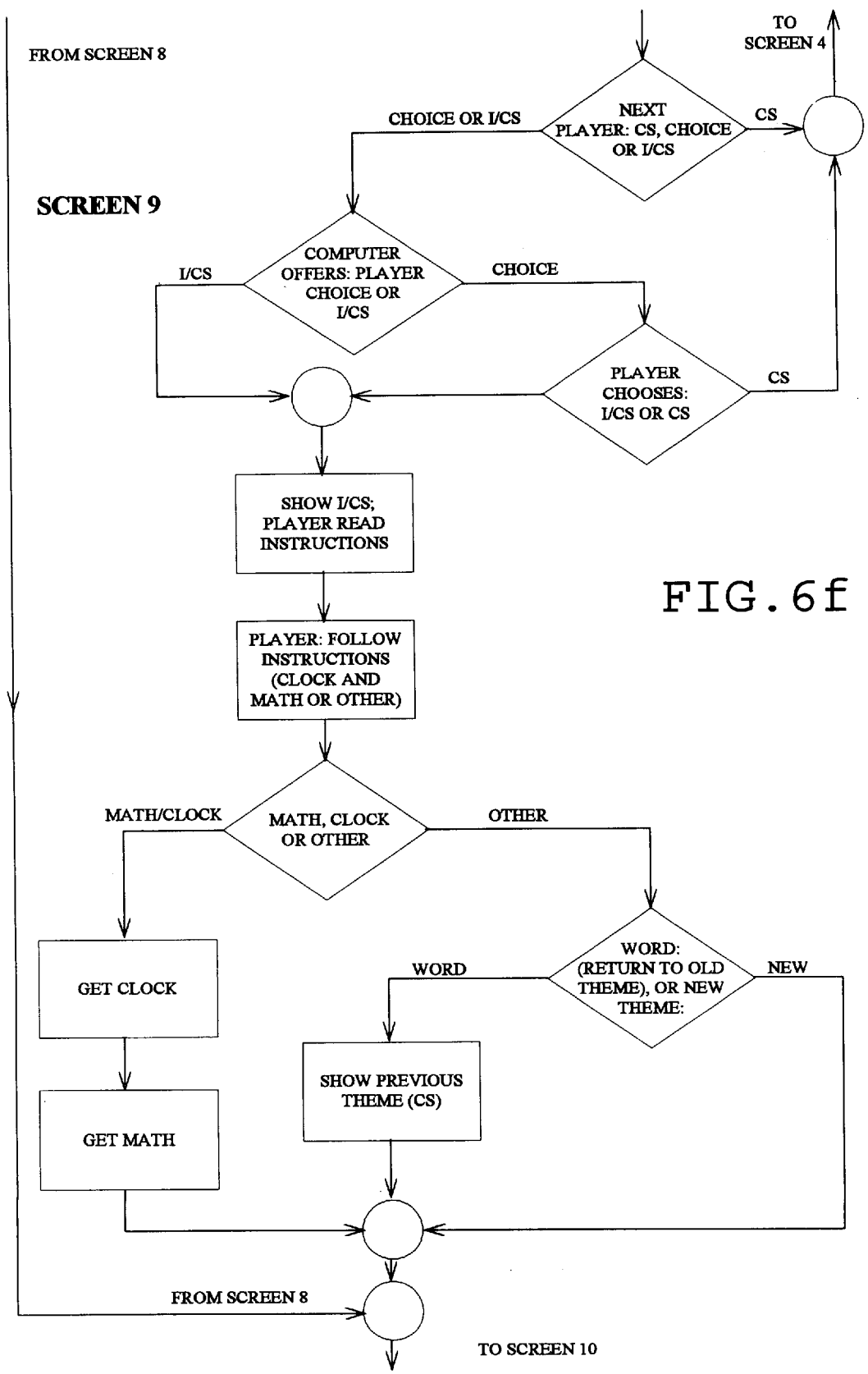
Figure 6G:
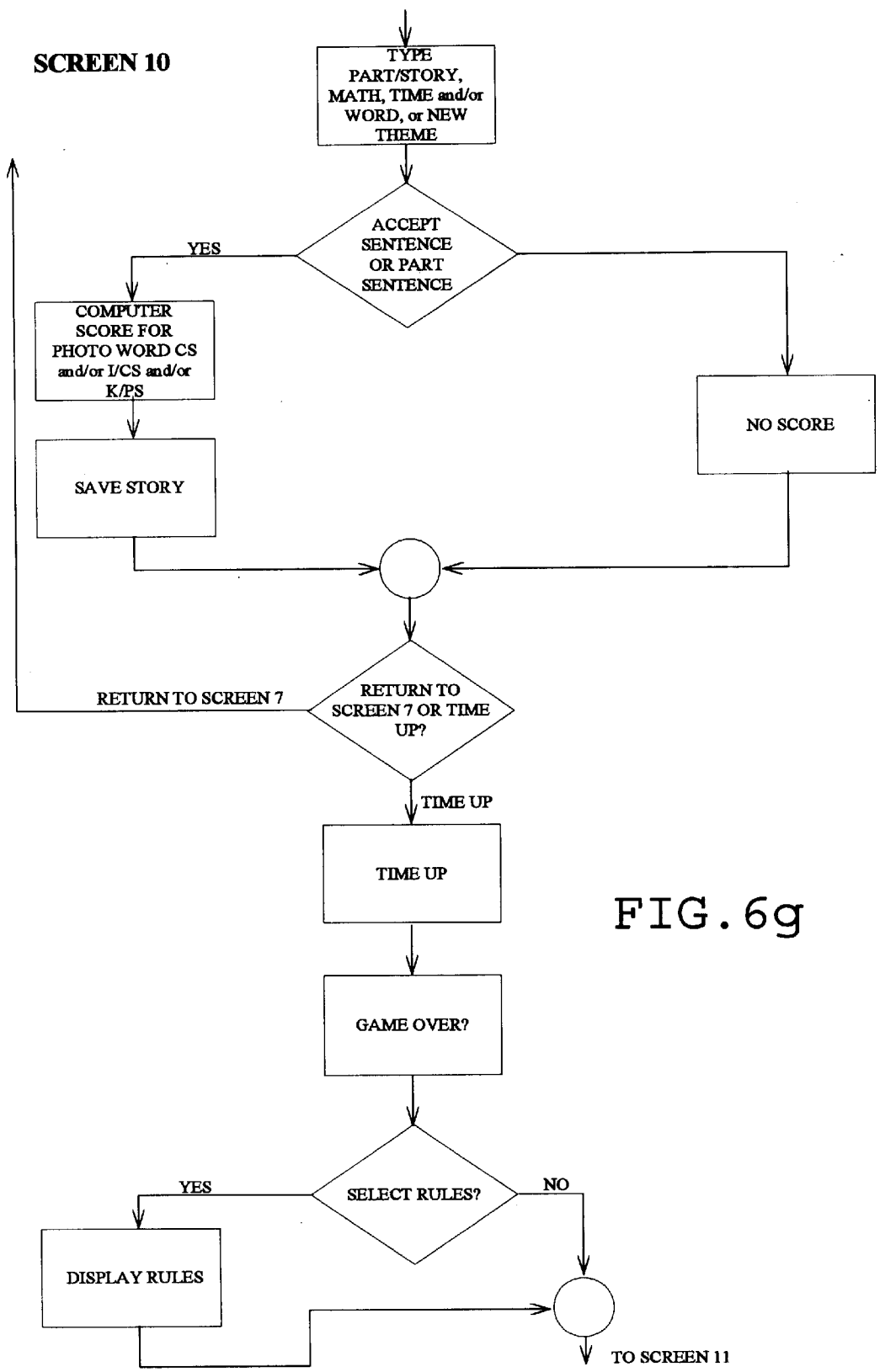
Figure 6H:
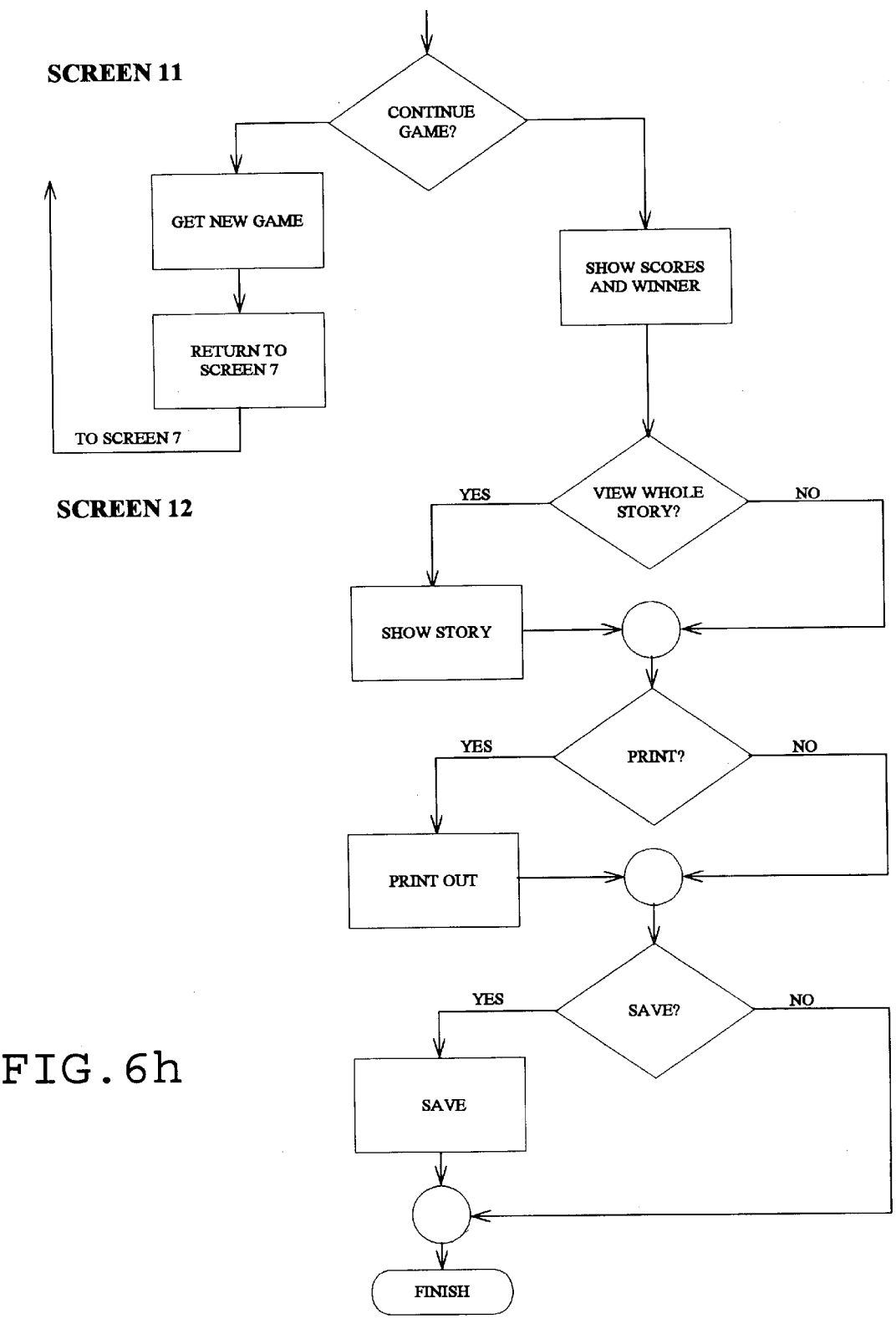

As shown in FIGS. 4 and 5 the advance wheel 32 comprises a pair of substantially circular discs 34A, 34B respectively. One disc 34A has on one face a first ball race 36 adjacent its periphery, and a second ball race 38 adjacent and inside the first ball race 36. Each race 36, 38 is defined by a circular channel formed in the transparent disc 34A. The races 36, 38 are designed to movably receive a first and second ball (not shown) respectively, therein. The other disc 34B has a series of first and second indentations 39, 40 located opposite the first and second ball races 36, 38, respectively. There are twelve (12) and sixty (60) evenly spaced indentations 39, 40 at the base of each of the first and second ball races 36, 38 respectively. The disc 34B is numbered adjacent each of the indentations 39, 40 so that the advance wheel 32 resembles the markings on a clock face. The disc 34B may also be coloured to clearly distinguish each of the ball races 36, 38.

The board game 10 of this example further comprises a set of "Guidelines and Rules" which explain how the game is to be played and the rules thereof including the scoring of players. A notepad is used to record the conversation in the foreign language during the game. The game 10 may also include score sheets to be used by each player for scoring, and optionally a cassette audio tape wherein players can record their conversation during the game 10.

The game box 12 can also contain the playing board 13 which may conveniently be folded in half. The playing board 13 of this embodiment as shown in FIG. 2 has on one surface thereof instructions in bahasa Indonesian and on an opposite surface instructions in the English language. Each surface has in its central region a map of Australia or Indonesia. In an alternative arrangement there may be two playing boards each having instructions in the national and foreign language, respectively.

The playing board 13 is subdivided into a plurality of first adjacent spaces located around its periphery defining a first track 42. Each space contains an instruction in bahasa Indonesian or the English language depending on which face of the board 13 is played. Adjacent each instruction the space can also contain a picture or label. For example, the space may contain in bahasa Indonesian an instruction " . . . went shopping . . . ", together with a picture of shops or markets in Denpasar. A plurality of second adjacent spaces defining a second track 44 is located inside the first track 42 and forms a border around the map of Australia or Indonesia. The second track 44 has spaces each containing an instruction and picture or label of a different vocabulary level, in this example more advanced, than that contained in the spaces of the first track 42.

The playing board 13 may include as an option removable first and second tracks 42, 44 or spaces for each track 42, 44. In one such example, a rectangular frame or cartridge, not illustrated, is designed to be superimposed on either the first or second track 42, 44. The cartridge is loaded with a series of photographs, drawings, and/or instructions prior to commencement of the game. The cartridge can then be removably fixed to an upper surface of the board 13 superimposed over the first or second track 42, 44. The game may thus be set up to satisfy the particular learning requirements of players. Alternatively, separate photographs, drawings, and/ or instructions may be fixed to the board over selected spaces on the first and/or second tracks 42, 44. The photographs, drawings, and/or instructions in one example are supplied as stickers which can be adhered to and removed from spaces on the playing board 13.

Each of the conversation starter cards contained in the deck 24A, 24B has a sentence designed to commence a conversation in bahasa Indonesian or the English language (whichever is the foreign language). An example is, "Sekarang saya di Bali saya mau melihat Denpasardan" on one surface of a conversation starter card and the English translation thereof "Now I am in Bali, I want to see Denpasar and" on an opposite surface.

Each of the keyword/phrase cards contained in the deck 26 has at least one bahasa Indonesian word such as "Di sini" and the English translation thereof "Here" on an opposite surface. In one example of the game there may be up to ten (10) different forms of keyword/phrase cards including: one or more keywords, a phrase (complete or incomplete), one or more keywords together with a bonus score, a blank card, a choice of keywords or phrases, or any combination thereof. There may be between 400 to 500 keyword/phrase cards in each deck 26. One (1) in approximately every ten (10) keyword/phrase cards may be a blank keyword/phrase card, and one (1) in approximately every forty (40) cards may include a bonus score. Keyword/phrase cards may be bought and sold during the game at a price determined by the players negotiating for keyword/phrase cards. Furthermore, a new set of ten (10) keyword/phrase cards may be purchased for a predetermined price. The keyword/phrase cards are generally coloured differently on both sides to distinguish the national and foreign languages. Keyword/phrase cards are designed as triggers to begin or extend a conversation. Each card is worth a fixed monetary value in Rupiah or Australian dollars when used in conversation.

Each of the instructions/conversation starter cards contained in the deck 28 have instructions in the foreign language which are designed to begin or continue a conversation. They also assist players in reading and carrying out verbal or written instructions in the foreign language. A translation in the English language for each instruction is contained on an opposite surface of the instructions/ conversation starter card. The instruction/conversation starter card may also include a direction as to paying or receiving money from a player to whom the instruction is addressed. For example, the instruction/conversation starter card may say that in your conversation you are to ask the player on your right in bahasa Indonesian "Was that horse or mushroom in my omelette?" with the English translation thereof on the opposite surface of the card. The instruction/ conversation starter card may further direct that if the answer given in bahasa Indonesian is "Horse" you take 200 Rupiah from that player. On the other hand if the answer given is "Mushroom" you are to give that player 200 Rupiah.

Alternatively the instruction/conversation starter card may contain a sentence in bahasa Indonesian designed to commence a new conversation such as "When my grandmother went to the market she . . . " in which case a player is to continue the conversation using if possible words contained in keyword/phrase card(s). Instruction/ conversation starter cards are also designed as reading cards including, for example, tourist information with a view to developing creativity. The instruction/conversation starter cards may also be used in conjunction with the advance wheel 32 in conversation. An instruction/conversation starter card may also include a bonus which may, for example, be included as a number in an incomplete phrase. This is intended to help players associate important numbers/dates.

To distinguish words or sentences to be used in conversation from instructions, the former can be contained within quotation marks and the latter used without quotation marks. A player can thus more easily, particularly when both the words or sentences and instructions are in a foreign language, distinguish between the two. This format may be used on writing within spaces on the playing board 13 as well as on cards.

In order to achieve a better understanding of a method of play according to the present invention, an example of the game played using the above board game 10 will now be described in detail.

In this example the game will be played in such a way that the bahasa Indonesian is considered to be the foreign language and English the national language. Prior to commencing the game the players are to jointly decide at what level of foreign vocabulary the game is to be played and consequently which deck of conversation starters 24A or 24B, keyword/phrase 26, and instructions/conversation starter 28 cards are to be used. Cards may also be removed from one or more of the decks so that the game is structured to meet the requirements of the players. The players need also to jointly decide which track of the playing board 13 the game will be played on, being about the first 42 or the second 44 tracks. The players may decide to move from the first 42 to the second 44 track as the game progresses. Each player then selects a taw with which they will play with and places this on the space of the first or second track 42, 44 marked "START HERE".

In one example of the game there are eight (8) levels of foreign vocabulary at which the game can be played. The keyword/phrase, conversation starter, and instructions/conversation starter cards are thus supplied in eight (8) differently coloured decks. Alternatively, the game can be purchased at various foreign vocabulary levels depending on a person's requirements.

Each deck of conversation starter 24, keyword/phrase 26, and instructions/conversation starter 28 cards selected to be played with are shuffled. Each player then randomly selects ten (10) keyword/phrase cards from one side/end of the box 18 and returns used cards to the other side/end of the box 18. Players are thus not taking keyword/phrase cards from those recently returned to the box 18. These keyword/phrase cards are used by a player during the game in conversation. The last person to have a turn becomes the scorer which enables other players to concentrate on the game. Scores are usually kept in the foreign currency, in this example Rupiah, on a score sheet.

The advance wheel 32 is then shaken by each player in turn and a player with the highest number shown in the first race or a player to first shake number twelve (12) commences. The first player randomly selects a conversation starter card from one side/end of the box 16A or 16B containing the conversation deck 24A and is to read the sentence(s) and/or unfinished sentence in bahasa Indonesian contained therein. It is important to the game that an unfinished sentence is included in the conversation starter so that each player has an unfinished sentence to complete in their foreign language conversation. Assuming the sentence is correctly read to the satisfaction of all other players the first player will then receive the fixed Rupiah value of the conversation starter card. The first player then continues the conversation in bahasa Indonesian following the theme of the conversation card using at least one keyword/phrase card.

For each keyword/phrase card used in conversation the player receives a predetermined score, for example 90 Rupiah. A player may use from one (1) to approximately fourteen (14) bahasa Indonesian words from their own vocabulary, and the sentence must be rational otherwise the player does not score. A preceding player is to record, preferably in writing, a current player's conversation so that the conversation is recorded for subsequent players and the players have practice in writing in the foreign language.

A second player then shakes the advance wheel 32 to determine the number of spaces the second player's taw is to be moved on the playing board 13 corresponding to the number adjacent the first race 34. If, for example, the number is six (6) the taw is moved six (6) spaces. The space may contain:

(a) a photograph/drawing with an instruction; or,
(b) an instruction saying:
  i. "Take an instruction conversation starter card"; or,
  ii. "Take a conversation starter card"; or
  iii. "Take an instruction/conversation starter or a conversation starter card".

On randomly selecting an instruction/conversation starter card from one side/end of the box 20 the second player may, for example, be required to continue the first player's conversation in bahasa Indonesian with an option of including the word "holiday". Use of the word "holiday" may have twice the value of a keyword/phrase card. If the second player is instructed to take a conversation starter or an instruction/conversation starter card the player must first complete the first player's conversation following the theme thereof. The second player is scored accordingly.

A third player will follow the conversation starter or instruction/conversation starter card which the second player was instructed, from the board 13, to take. The third player will receive points for the Rupiah value shown on the conversation starter or instruction/conversation starter card plus additional Rupiah for any keyword/phrase card(s) used in continuing the new conversation. The conversation is thus extended to at least two (2) players so that the conversation during the game is not fragmented and illogical. The space landed on may also contain an instruction as to Rupiah gained or lost.

For example, the current player may score:

| | |
|---|---|
| Two keyword/phrase cards: | 2.000 Rupiah |
| | 1.200 Rupiah (includes a bonus) |
| Playing board: | gain 1.000 Rupiah |
| Instruction/conversation starter card: | gain 2.000 Rupiah |
| Total Rupiah for the current player: | 6.200 Rupiah |

A fourth player may then continue in a similar manner to the second and third players. The fourth player's taw may, for example, land on a space with an instruction to shake the advance wheel 32 to determine the time. The time may be given before proceeding with the conversation or worked into the preceding conversation of the player in bahasa Indonesian. The fourth player is scored according to the Rupiah value shown in the space landed on, plus a set value for correctly telling the time, plus any keyword/phrase cards used in conversation. Alternatively, a similar instruction for determining the time may be contained in an instruction/conversation starter card. The first race 36 in the advance wheel 32 may also be used to designate a calendar month corresponding to the number shaken, for example, the number "6" corresponding to the month of June. A colour may also be requested in an instruction in a space or contained on an instruction/conversation starter card wherein a player is to incorporate in bahasa Indonesian the colour in conversation and possibly point to the colour. Each of the decks 26 of keyword/phrase cards may, for example, be a colour of the rainbow or white in which case the next player will point to the appropriate deck.

A fifth player may continue in a similar manner to the second, third and fourth players. The fifth player may, for example, land on a space containing part of a sentence in bahasa Indonesian such as " . . . old boat . . . ". This part sentence is then to be built on in the bahasa Indonesian using keyword/phrase cards together with the fifth players own bahasa Indonesian vocabulary ensuring the theme of the fourth player's conversation is continued. Points or Rupiah are then scored accordingly.

With five (5) players in a game the game then returns to the first player who then commences to move around the playing board 13 in a similar manner to the other players.

Each player is to maintain ten (10) keyword/phrase cards during the game. After their turn, therefore, they are to replenish their keyword/phrase cards by randomly selecting the appropriate number from the deck 26. A player may choose, when their turn comes, to purchase a new set of ten (10) cards for a predetermined price.

During conversation each player may refer to the English translation on the opposite surface of each keyword/phrase or conversation card. This may assist them in continuing a conversation in bahasa Indonesian. A player may also purchase advice from another player where they require assistance in beginning or continuing a conversation in the foreign language. Furthermore an English-bahasa Indonesian dictionary may be provided for assisting players in their bahasa Indonesian conversation.

Players may either lose Rupiah or not score where, for example, they use more than approximately seventeen (17) words in their conversation. The board 13 may also contain directions as to the loss of Rupiah. The player with the highest score at any time may also choose to change the conversation before shaking the advance wheel 32. In this case the player electing to change the conversation will firstly complete the conversation of the preceding player, and the next player proceed in a similar manner to the first player commencing the game.

During the course of a game the players may unanimously vote to move to the second track 44 bordering, in this example, the map of Indonesia. Each player will then proceed to the second track 44 once they reach a bridge (not shown) linking the first 42 and second 44 tracks. The second track 44 advantageously provides spaces containing instructions of a higher vocabulary level to those instructions contained in the spaces of the first track 42.

The game can be concluded in a variety of ways. The players may, for example nominate a period of time such as one (1) hour, at which time the player with the most Rupiah wins. Alternatively the game may be terminated when a player has achieved a certain Rupiah value.

The game is also intended to be adapted for use on a computer or the like. The game when played with a computer proceeds in substantially the same way as the card game described. When played with a computer, a computer screen and a processor together comprise means for carrying information which can be electronically selected and displayed on the computer screen.

FIG. 6a to 6h illustrates a flow diagram of an example of a method for playing the game, from which an appropriate computer program can be developed. The various logic steps shown in the flow diagram will now be described in some detail. The following legend explains abbreviations used in the flow diagram:

| keywords/phrases | K/P |
| conversation starters | C/S |
| instructions/conversation starters | I/CS |

Located either at the top or bottom of each screen displayed during the game is the following menu:
HELP: Rules—EDIT: Edit Players' Type, Temp Omit or Restore Cards—DISPLAY OTHER SIDE OF CARD (National language)—GO TO NEXT PLAYER—LOOK (at current keywords/phrases or conversation starters)—NEGOTIATIONS—SPELLCHECK (optional)—GRAMCHECK (optional)—GAME OPTIONS—VIEW STORY—SCORE—THESAURUS (optional)—DICTIONARY (optional)—MAPS—CUT AND PASTE—COPY—PRINT.

The first screen to appear when the game is initiated welcomes the player(s) to the game and asks whether the player(s) wish to view the rules of the game. If requested the rules are then displayed or otherwise the player is to select the option of playing on one computer or a network of computers, such as on the INTERNET. If a single computer is selected the player is then asked if they wish to play alone ("solo") or with a group. When a group of players is selected the program then asks how many players are to play the game. Similarly, where the game is to be played on the INTERNET the number of players is requested and recorded.

The program then moves to a second screen which asks the player(s) to nominate both a foreign language and a national language in which the game is to be played. The players are then to select at what vocabulary level the game is to be played. There may be a choice of up to approximately eight (8) vocabulary levels and one (1) tourist level from which the players may select. The players may then select a set of board photographs or drawings and instructions from a selection which can be displayed. Alternatively, the players may choose to play the game without a board. The players then set a time limit for the duration of the game, for example one hour and 30 minutes.

A third screen then appears which firstly asks for each player to type in their name or code. Once all players have entered their names or codes the computer then randomly selects a first player and randomly positions the other players in playing order. The program then randomly selects ten (10) keywords/phrase words for each player.

At screen four (4) the computer program randomly selects a conversation starter for the first player to use in beginning a conversation. The conversation starter remains in small print on the screen until the next conversation starter or instruction/conversation starter is given. The first player is asked whether they wish to view the rules of the game before commencing the foreign language conversation. If the player elects to view the rules of the game they are displayed on the screen. The player is then given the option of requesting assistance from either the computer or another player. For example, a player may use the DICTIONARY requested from the menu displayed on each screen to assist them in conversation. If assistance is requested from other players the name or code of the assisting player is entered in the computer and that player credited according to the keywords/phrases which they provide. The player requesting assistance is then debited a predetermined amount. Where no assistance is required the next screen, being screen five (5) then appears.

At screen five (5) the first player types a sentence(s) or part sentence using his/her own vocabulary and at least one of preselected keywords/phrases where possible continuing the theme of the conversation based on the conversation starter. The first player may also use the menu to check either the spelling or grammar of their sentence. The computer then registers the number of keywords/phrases used by the first player and accepts or rejects the first player's sentence. If the sentence is accepted the computer scores the first player according to the conversation starter and the number of keywords/phrases used. If the sentence is rejected by the computer the first player will only be scored for the conversation starter. The computer will record the conversation starter plus the first player's sentence such that the conversation or story is continually monitored. The computer then replaces any keywords/phrases used by the first player so that the first player's supply of ten (10) keywords/phrases is replenished. The computer displays the current sentence of the first player together with the conversation starter. The player is then scored by the computer. The next player or second player is then prompted to commence play. If, however, "solo" play was selected from screen one (1) the first player's keywords/phrases are displayed at screen seven (7). If group play was selected then a second player's keywords/phrases is displayed.

Where the game is to be played on a board, the computer then displays at screen eight (8) the board which was preselected (at screen 2), and then generates a random number using random number generating means. A playing marker is moved the appropriate number of spaces on the playing board and a space on which the playing marker lands is displayed. If, for example, a photograph or drawing and clock are displayed the player is then to type, in the foreign language, the time shown on the clock. The player is then scored by the computer. Alternatively, the space may contain a direction regarding selection of a conversation starter or instruction/conversation starter or choice thereof. In any case, the second player is then to complete the conversation initiated by the first player using as many keywords/phrases as possible. The second player is then scored according to the keywords/phrases they use in continuing the conversation.

At screen nine (9) where the second player is directed to select an instruction/conversation starter, conversation starter, or choice thereof, a third player proceeds by having the computer randomly select an instruction/conversation starter, or electing to choose between either an instruction/conversation starter or a conversation starter. At screen nine (9) an instruction/conversation starter is then revealed and the third player follows any instructions contained therein. If the third player elects to use a conversation starter the program then returns to screen four (4) which randomly selects a conversation starter. The instructions contained in the instruction/conversation starter may require the third player to read a clock, perform a mathematical calculation, or other task. Such a task may involve a third player including a word into and thus continuing the conversation of the second player, or beginning a new conversation based on the instruction/conversation starter.

At screen ten (10) the third player then types their response to the instruction/conversation starter. The sentence or part sentence is then either accepted or rejected by the computer. Where the sentence is accepted the player is scored according to the playing board, the instruction/conversation starter, and the keywords/phrases used. The computer continues to record the conversation or story of the player.

The program then checks to see whether the time limit set for playing the game has expired. If the time limit has not expired the program returns to screen seven (7) and performs the sequence of steps as hereinbefore described. Where the time has expired for playing the game a player is then asked whether they wish to select the game rules or not. A player may elect to continue to play the game at screen eleven (11) even though the time for playing the game has expired. If a player elects to continue playing the game a new time is entered and the program returns to screen seven (7) and wherein the conversation or story is continued in the foreign language. If the players elect to terminate play the program then displays the scores and designates the winner of the game.

If the players so elect, screen twelve (12) then displays the conversation or story which had developed during the game. The conversation or story can also be printed and/or saved prior to ending the game.

It should be appreciated that there may be numerous variations on methods for playing the game in addition to those already described and illustrated in the flow diagram shown in FIG. 6a to 6h. The flow diagram is merely illustrative of one preferred algorithm which is within the scope of the present invention.

Now that preferred embodiments of the present invention have been described in some detail it will be apparent that the game has at least the following benefits:

1. a foreign language can be learnt and developed in a fun and entertaining way in the form of a game;
2. the game can be adapted to suit people of all ages of varied vocabulary levels in a foreign language;
3. the game can be educational in terms of foreign culture, geography, literature, simple mathematics, basic sciences, social studies and tourist requirements, and encompasses a broad spectrum of subjects including accepted procedures and contacts for tourists in emergency situations;
4. the game can be terminated at any stage wherein a winner can still be determined;
5. the game is designed such that it is unlikely to date in future years;
6. the game is also designed to encourage creativity in literature, mathematics and conversation; and
7. the game is designed so that learning a second language is non-threatening, quick, and relatively easy.

It will be apparent to persons skilled in the relevant arts that numerous variations and modifications can be made to the described game in addition to those already mentioned above without departing from the basic inventive concepts. The game may in its simplest form be played solely with keyword/phrase cards. Players are then to begin a conversation using their own vocabulary in a foreign language. The game also may be played solely with conversation starter cards or with keyword/phrase cards and conversation starter cards. The game may be played by a single player who records his or her score for future reference. The game may also be played without the playing board as hereinbefore described. It is also intended that the game be produced in a variety of foreign and national languages wherein people from any country can play the game so as to learn and develop an understanding of a foreign language. The game may relate to one subject such as sciences, social studies, literature, mathematics, or a combination of two or more subjects. Drawing/photographs may be displayed on the keywords/phrases, conversation starters, and instructions/conversation starters. All such variations and modifications are to be considered within the scope of the present invention the nature of which is to be determined from the foregoing description.

I claim:

1. An apparatus for playing a game comprising:
   a playing surface subdivided into a plurality of first adjacent spaces defining a first track each of said first spaces containing at least an instruction in a foreign language;
   a set of playing markers each playing marker to be used by a player for moving about the first track; and
   means for carrying information for displaying one or more keywords/phrases which can be selected from a plurality of keywords/phrases and displayed in both a national language and a substantial translation thereof in the foreign language whereby, in use, a player begins or continues a conversation in the foreign language and the player or another player having moved one of said playing markers about the first track continues the conversation or begins a new conversation, in accordance with the instruction contained in the space on which said player's playing marker resides, in the foreign language using their own foreign language vocabulary in conjunction with said one or more keywords/phrases selected from said plurality of keywords/phrases.

2. An apparatus as defined in claim 1 wherein the means for carrying information can also display one or more conversation starters randomly selected from a plurality of predetermined conversation starters each having at least part of a sentence which can be displayed in both the national language and a substantial translation thereof in the foreign language whereby, in use, a player can begin a conversation in the foreign language using said at least part sentence from said one or more randomly selected conversation starters.

3. An apparatus as defined in claim 2 wherein said plurality of predetermined conversation starter cards are grouped according to their relative vocabulary level in the foreign language, wherein said one or more conversation starters can be selected according to the relative ability of the player in the foreign language.

4. An apparatus as defined in claims 1, 2 and 3 wherein said means for carrying information can also display one or more instructions/conversation starters randomly selected from a plurality of predetermined instructions/conversation starters at least some having at least part of a sentence and/or an instruction in the national language, and a substantial translation thereof in the foreign language whereby, in use, said one or more randomly selected instruction/conversation starters can be used, when directed from the playing surface, to begin or continue a conversation in the foreign language using a part sentence contained therein and/or to score the player according to an instruction contained thereon.

5. An apparatus as defined in any one of claims 1, 2, 3 and 4 wherein the playing surface further comprises a plurality of second adjacent spaces defining a second track each space containing an instruction of a different vocabulary level compared to the instructions contained in the plurality of the first adjacent spaces whereby, in use, a player can move from the spaces of the first track to the second track.

6. An apparatus as defined in claim 5 wherein the first and/or second tracks are removably displayed on the playing surface so that, in use, a player can select the first and/or second track, from a plurality of first and second tracks, prior to commencing the game.

7. An apparatus as defined in any of claims 1, 2, 3, 4, 5, and 6 further comprising a random number generating means used for randomly selecting the number of spaces a playing marker is to be moved whereby, in use, a playing marker is moved between the first spaces, according to a number randomly selected using the random number generating means, whereupon a player thereof can follow an instruction contained in a space on which the playing marker lands and the player is scored and/or begins or continues a conversation in the foreign language.

8. An apparatus as defined in claim 7 wherein the random number generating means comprises:
   a first ball race graduated from one to twelve adapted to movably receive a first ball whereby, in use, the number corresponding to the graduation on the first race adjacent the first ball is equal to the number of spaces a playing piece can be moved on the playing surface.

9. An apparatus as defined in claim 8 wherein the number corresponding to the graduation on the first race designates a calender month which can then be used by a player in the beginning or continuing a conversation in the foreign language.

10. An apparatus as defined in either claim 8 or 9 wherein the random number generating means further comprises:
    a second ball race graduated from one to sixty adapted to movably receive a second ball whereby, in use, the position of the first and second balls in the first and second ball races, respectively, designates a time which can then be used by a player in beginning or continuing a conversation in the foreign language.

11. An apparatus as defined in any one of claims 1 to 6 wherein said plurality of keywords/phrases are grouped according to their relative vocabulary level in the foreign language, wherein said one or more keywords/phrases can be selected according to the relative ability of the player in the foreign language.

12. An apparatus as defined in any one of claims 1, 2, 3, 4 and 11 wherein the means for carrying information comprises one or more decks of playing cards.

13. An apparatus as defined in any one of claims 1 to 12 wherein the means for carrying information comprises a visual display unit and a computer processor operatively coupled together.

14. A method for playing a game comprising the steps of:
    providing a playing surface having a plurality of first adjacent spaces, a set of playing markers, and means for carrying information for displaying one or more keywords/phrases which can be selected from a plurality of keywords/phrases, said one or more keywords/phrases being displayable in both a national language and a substantial translation thereof in a foreign language;
    one or more players each selecting one or more keywords/phrases from the plurality of keywords/phrases,
    each of said players in turn, having moved one of the set of playing markers about the playing surface, following an instruction contained in one of the first spaces on which said player's playing marker resides, said player in following the instruction beginning or continuing a conversation in the foreign language using their own foreign vocabulary in conjunction with said one or more selected keywords/phrases; and
    scoring said player according to said player's ability and/or usage of said one or more keywords/phrases in conversing in the foreign language.

15. A method for playing a game as defined in claim 14 wherein the means for carrying information can also display one or more conversation starters randomly selected from a plurality of conversation starters each having at least one sentence which can be displayed in both the national language and a substantial translation thereof in the foreign language said method further comprising the step of said player or said any other player beginning a conversation in the foreign language using said at least one sentence from said one or more randomly selected conversation starters.

16. A method for playing a game as defined in claim 15 wherein said plurality of conversation starters and keywords/phrases are grouped according to their relative vocabulary level; in the foreign language, wherein the method for playing the game further comprises the step of selecting said one or more conversation starters and/or keywords/phrases according to the relative ability of the player in the foreign language.

17. A method for playing a game as defined in any one of claims 14 to 16 wherein the means for carrying information can also display one or more instructions/conversation starters randomly selected from a plurality of predetermined instructions/conversation starters each having separately displayable at least part of a sentence and/or an instruction in the national language, and a substantial translation thereof in the foreign language, said method further comprising the step of a player, as directed from the playing surface, randomly selecting said one or more instructions/conversation starters and beginning or continuing a conversation in the foreign language using a part sentence contained therein and/or scoring the player in accordance with an instruction contained thereon.

18. A method for playing a game as defined in any one of claims 14 to 17 further comprising the step of moving the playing marker to a second space on the playing surface, containing an instruction of a different vocabulary level compared to the instructions contained in the first spaces, whereupon a player can follow the instruction and a conversation is begun or continued.

19. A method for playing a game as defined in any one of claims 13 to 17 wherein a player can refer to a sentence or keyword/phrase being a substantial translation in the national language of a conversation starter or keyword/phrase, respectively, so as to assist them in beginning or continuing a conversation in the foreign language.

20. A method for playing a game as defined in any one of claims 14 to 19 wherein a player is scored according to the number of keywords/phrases they have used in beginning or continuing a conversation.

\* \* \* \* \*